Figure 2:
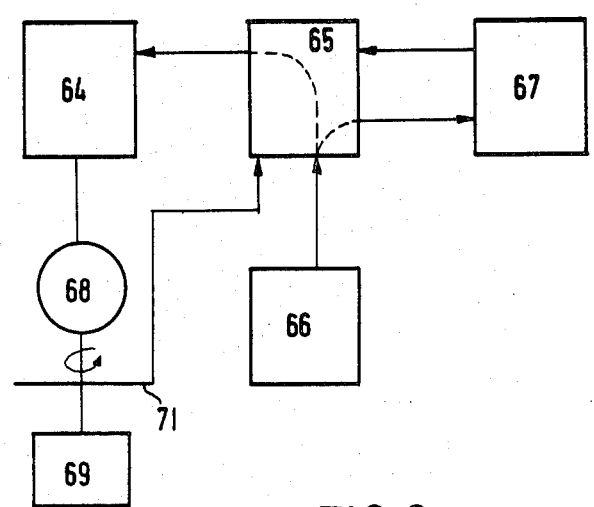

United States Patent [19]

Peddinghaus

[11] 3,810,406
[45] May 14, 1974

[54] CONVEYOR DEVICE FOR CONVEYING BARS

[76] Inventor: Carl Ullrich Peddinghaus, Lichtenplatzer Strasse 276, Wuppertal-Barmen, Obere, Germany

[22] Filed: July 11, 1972

[21] Appl. No.: 270,849

[30] Foreign Application Priority Data
July 12, 1971 Germany............................ 2134650
July 12, 1971 Germany............................ 2134652

[52] U.S. Cl.................... 83/222, 83/225, 83/241, 83/278
[51] Int. Cl............................................. B26d 5/26
[58] Field of Search......... 83/69, 71, 207, 222, 225, 83/226, 229, 239, 240, 241, 247, 363, 364, 367, 370, 372, 396, 416, 254, 276, 278

[56] References Cited
UNITED STATES PATENTS

| | | | |
|---|---|---|---|
| 3,322,961 | 5/1967 | Harrison et al. | 83/364 X |
| 2,233,490 | 3/1941 | Shields | 83/69 X |
| 3,559,257 | 2/1971 | Lemelson | 83/71 X |
| 3,522,750 | 8/1970 | Shallenberg | 83/222 X |
| 3,072,003 | 1/1963 | Sirugue | 83/396 X |
| 3,348,440 | 10/1967 | Jensen | 83/69 X |
| 3,670,614 | 6/1972 | Streckert | 83/416 X |

Primary Examiner—Roy Lake
Assistant Examiner—James F. Coan

[57] ABSTRACT

A conveyor device is provided for conveying bars longitudinally to a machine which processes the bars. A drive of a conveyor member which moves in the longitudinal direction can be switched off after predetermined section lengths have been attained and can be switched on again after processing has been carried out. The switching off and the switching on is controllable by means of impulses which are released by impulse generators when a pre-selectable section length is obtained by means of a section length selector switch or after processing has been carried out. The successive section length is pre-selected while the previous section length is being processed. The section length selector switches form together a sequence programme and the section length selector switches corresponding to the section lengths can be switched in to a programme storage circuit with a number of stores for forming the conveying programme. The circuit switches itself forward by one store at each switch-in step and is in turn able to be switched over to a control switch of a drive of the conveyor member in order for the conveying operation to be carried out, in which switch position it switches itself forward by one store after each section conveying and processing operation.

10 Claims, 7 Drawing Figures

FIG.1

CONVEYOR DEVICE FOR CONVEYING BARS

The invention relates to a conveyor device for conveying bars, more particularly but not exclusively bars of steel for reinforcing concrete, longitudinally to a machine which processes the bars, whereby the drive of a conveyor member which moves in the longitudinal direction can be switched off after predetermined section lengths have been attained and can be switched on again after the processing has been carried out, and whereby said switching off and said switching on is controllable by means of impulses which are released by impulse generators when a pre-selectable section length is attained by means of a section length selector switch or after processing has been carried out and whereby the successive section length is pre-selected while the previous section length is being processed.

It is an object of the present invention to provide such a conveyor device in an improved form.

In accordance with the present invention there is provided a conveyor device for conveying bars longitudinally to a machine which processes the bars, whereby a drive of a conveyor member which moves in the longitudinal direction can be switched off after predetermined section lengths have been attained and can be switched on again after processing has been carried out and whereby said switching off and said switching on is controllable by means of impulses which are released by impulse generators when a pre-selectable section length is attained by means of a section length selector switch or after processing has been carried out, and whereby the successive section length is pre-selected while the previous section length is being processed, characterised in that section length selector switches form together a sequence programme and in that the section length selector switches corresponding to the section lengths can be switched in to a programme storage circuit with a number of stores for forming the conveying programme, said circuit switching itself forward by one store at each switch-in step and being in turn able to be switched over to a control switch of a drive of the conveyor member in order for the conveying operation to be carried out, in which switch-position it switches itself forward by one store after each section-conveying and processing operation.

The programme storage circuit used can be a relay circuit which switches itself forward by current impulses through its individual stores.

In a conveyor device of the type described it should not only be possible to switch over quickly to different section length selector switches but it should also be possible to convey the bars rapidly with as few delays as possible. For this reason switches are provided along the conveyor path which can be switched on to the individual section lengths and which can be released by means of an impulse generator fitted on each of two feed members and which keep the drive of the feed member interrupted until it is switched on again by a further switch which is actuated after each bar section has been processed; the two feed members are disposed on a driven, continuous pulling member which rotates in the direction of the length of the bars, the members being positioned on opposite parts of said pulling member. This has the advantage that the conveyor device only has to be driven in a forward direction and that the next conveying operation can be begun after the feed member of the previous conveying operation has reached the underside of the pulling member. The latter pulling member can conveniently be a rotating chain which has a driven guide roller on the delivery side. The impulses can also be released by the guide roller and can then be counted in a counting circuit, whereby this counting circuit is also a section length selector switch which can be switched on to a different impulse count and this to a different section length.

Figure 3:
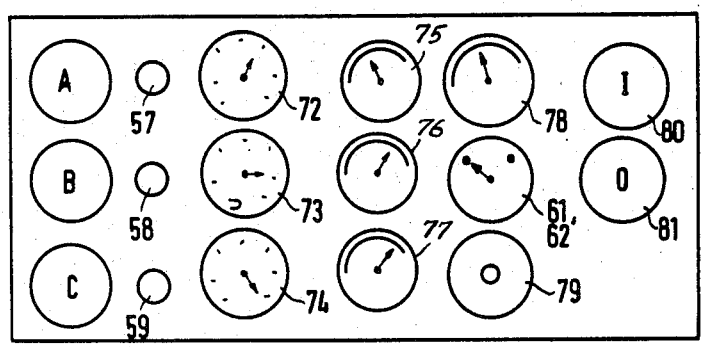
Figure 4:
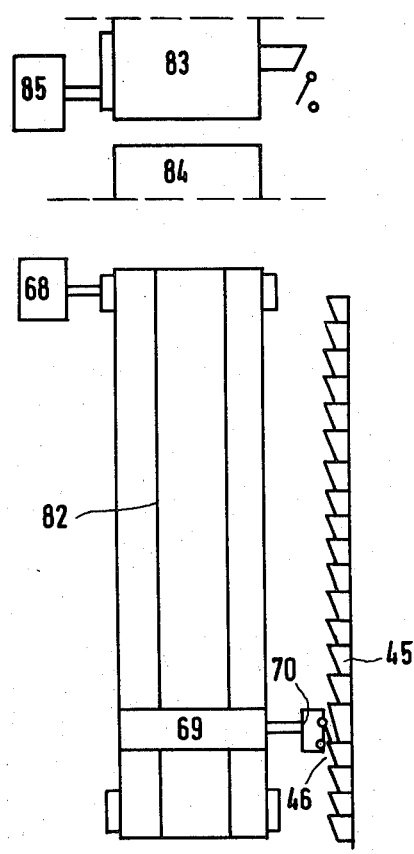
Figure 5:
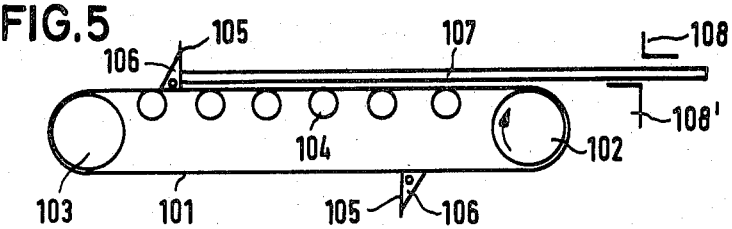
Figure 6:
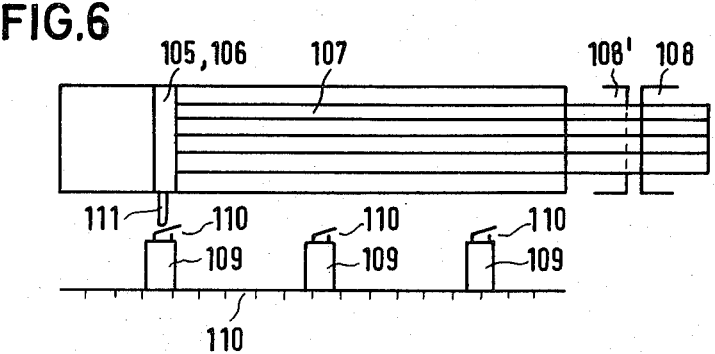
Figure 7:
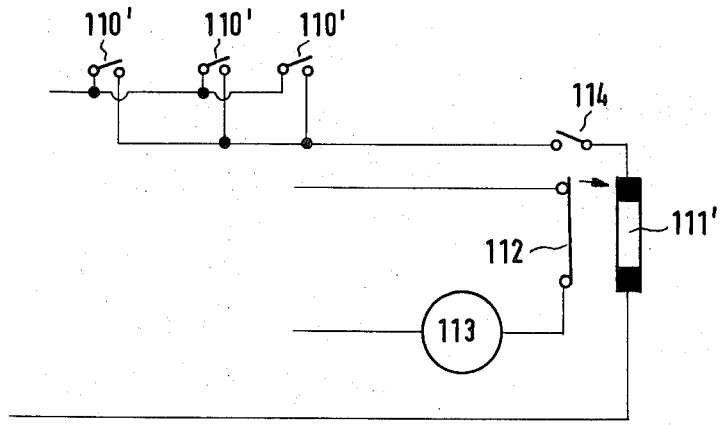

The invention will now be more particularly described with reference to the accompanying drawings which illustrate one embodiment of a conveyor device constructed in accordance with the present invention. In these drawings:

FIG. 1 shows a simplified circuit diagram,
FIG. 2 shows a block circuit diagram,
FIG. 3 shows the arrangement of an operating switch of a section length selector switch,
FIG. 4 shows a possible arrangement of adjusting members,
FIG. 5 shows a conveyor device from a side view,
FIG. 6 shows a plan view of the conveyor device shown in FIG. 5, and
FIG. 7 shows an impulse generator circuit.

Referring to the circuit diagram of FIG. 1, there is shown two current supply lines 38 and 39 in which the control current flows at a relatively low voltage. In addition three section length selector switches A, B, C are shown, in which differing length values can be set, for example by selecting a mark representing a desired number of impulses. For the sake of clarity, only three different section length values are marked. Adjusting knobs or like manual controls can be used to select the required work.

Each terminal section length selector switch corresponds to a single section length and is connected to the corresponding terminals of the other section length selector switches through lines 40, 41 and 42 the latter in turn leading to the three correspondingly marked terminals of a step counting mechanism 43. This step counting mechanism is operated by current impulses which act on an associated coil 44. In the embodiment these impulses from an impulse generator 46 are released by trip cams 45 arranged along the length of a conveyor, said impulse generator 46 being connected to the conveyor so as to move past the cams 45.

If a time control is used for the conveying of the section lengths of bars an arrangement with R.C networks is conveniently chosen so that after a pre-determined time period has ended an electrical signal is given without mechanical switching means being required for this.

The step counting mechanism 43 is connected to the current supply line 38 through the relay coil 47. The relay coil 47 operates a changeover switch 48 which is only shown in diagrammatical form, through which switch the drive (not shown) of the conveyor member is switched off when a predetermined section length is attained.

The last-mentioned energising circuit for switching off the drive is connected through one of the section length selector switches A, B or C, one of the stores 32 to 37 of a programme storing circuit, said stores being connected to the switches A, B, C, a step switching mechanism 49 and a line 50.

The section length selector switches A, B or C are connected at any given time with all the stores 32 to 37 of the programme storing circuits. For the sake of clarity only six stores have been shown, whereby in the same way the connection of these six stores has only been shown to selector switch A also for reasons of clarity. Each of the stores 32 to 37 has a current supply through lines 51 and 52. An essential part of each store is a self-hold relay which is illustrated in the connection lines to the selector switch A, the left-hand relay which belongs to the connection of the section length selector switch A to the store 32, is indicated by the reference numeral 53.

Each store 32 to 37 is in addition connected to the individual contacts of the step switching mechanism 49 which is stepped by current impulses which are supplied to an associated coil 54. These impulses are either released by an impulse generator 55 which co-operates for this purpose with a trip cam 56, the cam 56 being connected to a bar processing machine, for instance with a cutter of the processing machine, in a convenient manner such that after processing operation has finished a current impulse is released. On the other hand the impulses for stepping the mechanism 49 can also be released by one of three key switches 57, 58 or 59 which are associated with three section length selector switches A, B and C. These key switches are double-pole single way switches and when they are operated a connection between the supply line 39 and a line 60 is formed. The line 60 leads to a changeover switch 61 which forms, according to choice, a connection between the coil 54 of the step switching mechanism 49 and the impulse generator 55 or alternatively, between the coil 54 and the key switches 57, 58 and 59.

Moreover the key switches 57, 58 or 59 form, when operated, a connection between the supply line 39 and the selector switch A, B or C which is associated with it.

Each of the selector switches A, B and C is normally adjusted to a specific section length. This adjustment is retained unaltered. If now the switch 61 is moved to the position shown by a broken line and at the same time the key switch 57 is closed, current flows in the connection between the selector switch A and the store 32 because the latter is connected to the current supply 38 by means of the step switching mechanism 49 and a switch 62 as well as by a branch line 63. The self-holding relay 53 then goes into a self-holding state and effects in addition in the circuit of the store 32 a further switching operation as a result of which the connection to the selector switch A on the one hand and to the step switching mechanism 49 on the other hand both remain made even if the releasing current impulse has ceased. The latter occurs when the step switching mechanism 49 switches itself one switching step further. This happens with a delay period, which is necessary for reasons of circuit technology, whereby the changeover switch 61 finds itself in the position shown by the broken line.

At the same time the changeover switch 62, which can be coupled in a convenient manner to the changeover switch 61, also finds itself during this operation in the position indicated by a broken line.

It is to be appreciated that the stores of the programme storing circuit can be occupied in any manner desired with preadjusted section length circuits by operating the key switches 57, 58 or 59. Since the step switching mechanism 49 switches on a step each switching operation, double occupance of each store is not possible.

When the stores have been loaded the switches 61 and 62 are moved over into their marked position. The circuits formed in the stores 32 to 37 remain kept through self-holding of appropriate relays because said stores possess their own current supply. The normal conveying operation can then be commenced and this is carried out in such a way that the step switching mechanism 49 switches itself on from conveying one section to conveying the next section in order to switch in the next highest store. After the sequence programme has finished the step switching mechanism 49 returns to its starting position so that the next conveying operation can be commenced.

FIG. 2 shows how the individual circuits work together, appropriate block circuit diagrams being used. A main current supply circuit 64 is supplied from the current supply mains and contains in the usual way contactors, cutouts, transformers and rectifiers so that on the one hand the drive motor 68 of the conveyor and on the other hand the control circuit 65, the section length selector switch 66 and the programme storage circuit 67 are supplied. The section length selector switch 66 through which section lengths can be adjusted in the manner described above, is connected according to choice, to the programme storage circuit 67 or to the control circuit 65. The possibility of choice enables the conveyor drive to be connected directly through the control circuit 65 by disconnecting the programme storage circuit. However, in the programmed conveying operation which usually takes place the section length selector switch 66 is connected to the programme storage circuit 67. This circuit 67 is connected to the main current supply 64 by the control circuit 65 which is connected between these, and it effects in the manner described the connection of the drive motor 68 of the conveyor member 69. The impulse transmitter which is connected to the processing machine for instance the cutter, transmits an impulse when the processing operation is over and the processing machine is ready to take the next section lengths. This impulse is transmitted through the line 71 to the control circuit 65 and brings about the further switching of the step switching mechanism so that for the conveying operation the individual circuits stored in the stores 32 to 37 can be called.

FIG. 3 shows a switch indicator board which is conveniently constructed as the front plate of a housing which holds the section length selector switches. The key switches 57, 58 and 59 which have already been mentioned can be seen, these being associated with the selector switches A, B and C. Manual adjusting controls 72, 73 and 84 enable each of the selector switches A, B or C to be adjusted to a different section length. In addition adjusting potentiometers 75, 76 and 77 are also provided each of which corresponds to a selector switch and enables a pre-determined time to be switched in order to carry out any necessary corrections. The three adjusting potentiometers 75, 76, 77 are at the same time also adjustable by means of a common potentiometer 78 which can for instance be operated if the section lengths are adjusted by pre-selected time values and the conveying speed can take different values according to the load.

The changeover switches 61, 62 for changing over the programme storage circuit are also shown. In the one circuit the circuits are stored in, whilst in the other switching position they are called out of the storage device during consecutive conveying operations of sections.

A switch indicated by the reference numeral 79 serves to cancel the set programme. This can happen when the current supply to the stores is broken. Through this the relays which were previously in a self-holding state open so that the section length selector switches which had been adjusted by this are broken.

Finally, two switching knobs 80 and 81 for connecting and disconnecting the main current supply are shown.

FIG. 4 shows in diagrammatic form the conveyor in plan view with a cutter attached to it, said cutter being shown in elevation so that it is clearer. The conveyor member 69 which is constructed as a stop is driven for instance by a rotating cable line 82 which is in turn driven with the help of the drive motor 68. An adjusting member 70 is disposed on the conveyor member, said member 70 carrying the impulse generator 46. Trip cams 45 are arranged along the conveyor stretch, each of these actuating the impulse generator contact 46. Since the circuit is adjusted to numbers of impulses corresponding to the section lengths the drive motor 68 is disconnected when a predetermined section length along the conveying track is reached.

In addition one can also see the cutter which is driven by a motor 85 for instance by means of an eccentric which is not shown, and which comprises a fixed part 84 and a movable part 83. The trip cam 56 is connected to the movable part 83, and this cam actuates the impulse generator contact 55 when a cut has been made. The actuation of this contact then causes the drive motor 68 to be re-connected.

FIG. 5 shows the rotatingly driven chain 101, shown in digrammatic form. The guide roller 102, which is disposed on the delivery side, serves to drive said chain, whilst the guide roller on the feed side rotates idly. The chain is supported in its upper side by the rollers 104. It is constructed with two feed members 105 which are positioned exactly opposite each other on the chain. They can for instance be flexibly connected with chain bolts and be constructed with an angle stop 106 so that they cannot fold back at all. The bars 107 which are to be conveyed rest with one end on the feed member 105 and are passed in with their free ends into a machine which then processes them, in particular into a cutter 108'.

The plan view in FIG. 6 shows in addition the adjusting switches 109. These can for instance be moved on an adjusting dial 110 and can be locked in desired sections. Each of the switches 109 has a contact 110 which responds to a cam 111 of the feed member 105. As soon as the cam 111 has closed the contact the drive of the chain 101 stops.

This can be seen from the circuit shown in FIG. 7. The individual contacts 110' which are connected in parallel are shown. Each of the contacts 110' is able to close the circuit of the relay 111'. In an energised state the relay 111' opens a contact 112 which lies in the working circuit of the motor 113 for the drive of the guide roller 102. In this state processing, for example by releasing the cutter 108, 108', can take place. If following this a further section length is to be conveyed the circuit of the relay 111' must be opened again. A single switch 114 serves this purpose, said switch being released by hand by the machine operator after the cutter has made a cut.

The division into individual section lengths can be made in accordance with varying principles. For instance the necessities of a specific programme on the further processing machine can be complied with. Moreover available bar lengths can be divided up to an optimum extent so that the left over sections which are as a rule unavoidable can be kept as small possible.

The individual switches 110 as shown in FIG. 6 or 110' in FIG. 7 respectively release impulses when operated by the cam 111. They correspond to the switch 46 and the cam 45 of the circuit diagram shown in FIG. 1. The switch 114 shown in FIG. 7 is operated by a cam which is not shown in the drawing and which is connected to the movable part of the cutter. In comparison with the circuit diagram FIG. 1 this switch corresponds to that marked with the reference numeral 55; when the latter is operated the step counting mechanism 49 switches one store forward.

I claim:

1. A conveyor device for conveying bars, longitudinally to a machine which processes the bars, comprising a conveyor member movable in a longitudinal direction, drive means for the conveyor member which can be switched off after predetermined section lengths of bars have been advanced to the processing machine and can be switched on after processing by the machine is completed, impulse generating means connected to said conveyor and the processing machine and being actuatable to effect said switching off and said switching on of said conveyor drive means, and apparatus for pre-selecting the length of successive bar sections while the previous section is being processed; the improvement wherein said pre-selecting apparatus comprises at least three section length selector switches which form together a sequence programme, a programme storage circuit with a number of stores, means for switching said section length selector switches into said programme storage circuit to form the conveying programme, means for switching said storage circuit forward by one store at each switch-in step of one of said section length selector switches and for switching said storage circuit over to a control switch for said conveyor member drive means to effect the conveying operation, and means for switching said storage circuit forward to the next successive store after each bar section conveying and processing operation.

2. A conveyor device as claimed in claim 1, characterised in that the programme storage circuit is a relay circuit which switches itself forward by current impulses through its individual stores.

3. A conveyor device as claimed in claim 1, characterised in that the section length selector switches are connected by switches to the programme storage circuit.

4. A conveyor device as claimed in claim 1 characterised in that the section length selector switches can be switched directly in to the control circuit for the conveyor member.

5. A conveyor device as claimed in claim 1, characterised in that the section length selector switches can be adjusted to impulses which correspond to the section lengths of the bars and which are released by an adjusting member which is connected to the conveying member.

6. A conveyor device as claimed in claim 5, characterised in that the adjusting member which is connected to the conveying member is an impulse transmitter, fixed trip cams arranged along the conveyor track serve to operate said impulse transmitter, and in that further the processing machine is provided with a trip cam which operates a second impulse transmitter after one processing operation has been carried out.

7. A conveyor device as claimed in claim 5, characterised in that switches are provided along the conveying path which can be adjusted to the individual section lengths of the bars and which can be released by means of a cam which is disposed on two feed members, said switches serving to keep the drive of the feed members uninterrupted until a re-set is effected by a further switch which is operable after each bar section has been processed, and in that the feed members are arranged in opposite positions on a pulling member which is continuous and which is rotatingly driven in the direction of the bar length.

8. A conveyor as claimed in claim 7, characterised in that a rotating chain is provided as the pulling member, which has a driven guide roller on the delivery side thereof.

9. A conveyor device as claimed in claim 7, characterised in that each of said switches has a contact which is releasable in one direction by a cam of the feed members, a common relay is associated with said cam which cuts off the drive circuit of the pulling member when in an energised state, and in that the relay circuit is broken by means of a further switch.

10. A conveyor device as claimed in claim 8, characterised in that a roller guideway is provided for the upper side of the chain and in that the reverse guideway is at least at the level of the feed member.

* * * * *